US010639923B2

(12) United States Patent
Fu et al.

(10) Patent No.: US 10,639,923 B2
(45) Date of Patent: May 5, 2020

(54) HYBRID MEDIA SHEETS

(71) Applicant: Hewlett-Packard Development Company, L.P., Fort Collins, CO (US)

(72) Inventors: Xulong Fu, San Diego, CA (US); Haowen Yu, San Diego, CA (US); Bruce L. Cromer, San Diego, CA (US); Ronald J. Selensky, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 554 days.

(21) Appl. No.: 15/119,110

(22) PCT Filed: Mar. 19, 2014

(86) PCT No.: PCT/US2014/031210
§ 371 (c)(1),
(2) Date: Aug. 15, 2016

(87) PCT Pub. No.: WO2015/142326
PCT Pub. Date: Sep. 24, 2015

(65) Prior Publication Data
US 2017/0050457 A1     Feb. 23, 2017

(51) Int. Cl.
*B41M 5/50*     (2006.01)
*B41M 5/52*     (2006.01)
*C04B 41/00*     (2006.01)

(52) U.S. Cl.
CPC ............... *B41M 5/52* (2013.01); *B41M 5/50* (2013.01); *B41M 5/502* (2013.01); *B41M 5/504* (2013.01);
(Continued)

(58) Field of Classification Search
CPC ........ B41M 5/50; B41M 5/504; B41M 5/506; B41M 5/508; B41M 5/5218; B41M 5/5245; C04B 41/0018
See application file for complete search history.

(56) References Cited

U.S. PATENT DOCUMENTS

| 5,709,976 A | 1/1998 | Malhotra |
| 6,037,050 A | 3/2000 | Saito et al. |
(Continued)

FOREIGN PATENT DOCUMENTS

| EP | 1228889 | 8/2002 |
| JP | 2002166644 | 6/2002 |
(Continued)

OTHER PUBLICATIONS

International Search Report dated Dec. 17, 2014 for PCT/US2014/031210, Applicant Hewlett-Packard Development Company, L.P.

*Primary Examiner* — Betelhem Shewareged
(74) *Attorney, Agent, or Firm* — Thorpe North & Western LLP

(57) ABSTRACT

The present disclosure is drawn to hybrid media sheets, ink-receiving layer compositions for coating on a media substrate, and a method of making hybrid media sheets. The hybrid media sheet scan have a media substrate with a front barrier layer, a back barrier layer, an adhesion promoting layer applied to the front barrier layer, and an ink-receiving layer applied to the adhesion promoting layer. The ink-receiving layer can include a water-soluble polymer, a mordant, and particles of a metal- or semimetal-oxide.

15 Claims, 3 Drawing Sheets

(52) U.S. Cl.
CPC ............ *B41M 5/506* (2013.01); *B41M 5/508* (2013.01); *B41M 5/5218* (2013.01); *B41M 5/5245* (2013.01); *B41M 5/5254* (2013.01); *C04B 41/0018* (2013.01); *B41M 2205/34* (2013.01); *B41M 2205/36* (2013.01); *B41M 2205/38* (2013.01)

(56) References Cited

U.S. PATENT DOCUMENTS

| | | | |
|---|---|---|---|
| 6,749,982 | B2 | 6/2004 | Rao et al. |
| 6,913,722 | B2 | 7/2005 | Engle et al. |
| 7,651,216 | B2 | 1/2010 | Chen et al. |
| 7,687,120 | B2 | 3/2010 | Niu et al. |
| 8,293,343 | B2 | 10/2012 | Nakano |
| 8,313,808 | B2 | 11/2012 | Friour et al. |
| 2001/0024713 | A1* | 9/2001 | Quintens ................. B41M 5/52 428/32.38 |
| 2002/0025413 | A1* | 2/2002 | Ohbayashi ............... B41M 5/52 428/32.1 |
| 2003/0124273 | A1 | 7/2003 | Jung et al. |
| 2004/0157009 | A1* | 8/2004 | Ohbayashi ............... B41M 5/52 428/32.1 |
| 2005/0003112 | A1* | 1/2005 | Chen ...................... B41M 5/529 428/32.11 |
| 2006/0181587 | A1* | 8/2006 | Bauer ..................... B41M 5/52 347/100 |
| 2006/0210730 | A1* | 9/2006 | Howe ..................... B41M 5/52 428/32.24 |
| 2011/0003097 | A1* | 1/2011 | Chen ...................... B41M 5/504 428/32.21 |
| 2011/0039043 | A1 | 2/2011 | Klemann |

FOREIGN PATENT DOCUMENTS

| | | |
|---|---|---|
| JP | 2004330436 | 11/2004 |
| JP | 2010036343 | 2/2010 |
| KR | 20040053498 | 6/2004 |
| WO | 2009096922 | 8/2009 |

* cited by examiner

HYBRID MEDIA SHEETS

BACKGROUND

Inkjet photo media are typically categorized into two groups: porous media and swellable media. Porous media generally have an ink-receiving layer that is formed from porous, inorganic particles bound with a polymer binder. The inkjet ink is absorbed into the pores of the inorganic particles and the colorant can be fixed by various chemistries incorporated with the ink-receiving layer and/or by the physical surface of the inorganic oxides or inter-particulate space. Porous media tend to have a shorter dry time and better resistance to smearing because the ink is quickly absorbed into the pores of the ink-receiving layer. However, porous media can be susceptible to image fading, exhibit lower color gamut, and exhibit poor light-fastness. In swellable media, the ink-receiving layer is a continuous layer of a swellable, polymer matrix. When the inkjet ink is applied, the inkjet ink is absorbed by swelling of the polymer matrix and the colorant is immobilized inside the continuous layer. Since the colorant is protected from the outside environment, swellable media tend to have greater light-fastness and resistance to air fade than the porous media. However, swellable media generally have poor smear-fastness and a longer dry time compared to porous media.

DETAILED DESCRIPTION

Generally, a hybrid media sheet as disclosed herein can include a substrate base such as raw paper, barrier layers applied to the front and back sides of the substrate, an adhesion promoting subbing layer applied on top of the front barrier layer, and an ink-receiving layer applied on top of the adhesion promoting subbing layer. In one example, the back barrier layer can be applied more thickly than the front barrier layer, which helps to reduce curling. The ink-receiving layer can include a water-soluble polymer in major portion, particles of a metal- or semimetal-oxide in minor portion, and a mordant. In one example, these hybrid media sheets can be used for inkjet printing technologies.

The hybrid media that is prepared in accordance with the present disclosure can have acceptable light-fastness, smear-fastness, dry time, and curl performance across a variety of temperature and humidity conditions. For example, in many instances, the hybrid media sheet can have a better light-fastness than conventional porous media, and better smear-fastness than conventional swellable media. Also, improved curl performance can prevent excessive curling of the media after printing. The hybrid media sheet can also have a glossy finish similar to conventional swellable photo media. Thus, the hybrid media sheet can be suitable for printing photographs from an inkjet printer.

As used herein, the terms "light-fastness," "light-fast," and the like refer to the capacity of a hybrid media to retain images thereon in a stable manner without substantial fading, blurring, distortion, and the like over time in the presence of natural or man-made light. The terms "smear-fast", "smear-fastness", and the like, as used herein, refer to the production of images that exhibit minimal to no smearing or blurring when rubbed or otherwise physically engaged with a variety of objects. One type of smear-fastness of interest in inkjet printing is resistance to rubbing with the tip of a highlighter. Smear refers to transfer of printed ink from a printed area to a surrounding area due to rubbing. Another type of disruption due to rubbing can include actual removal of the printed ink from the media surface. This can result from insufficient adherence of the ink to the media surface or absorbance of the ink into the surface, as well as insufficient shear resistance within the printed ink.

Figure 1:
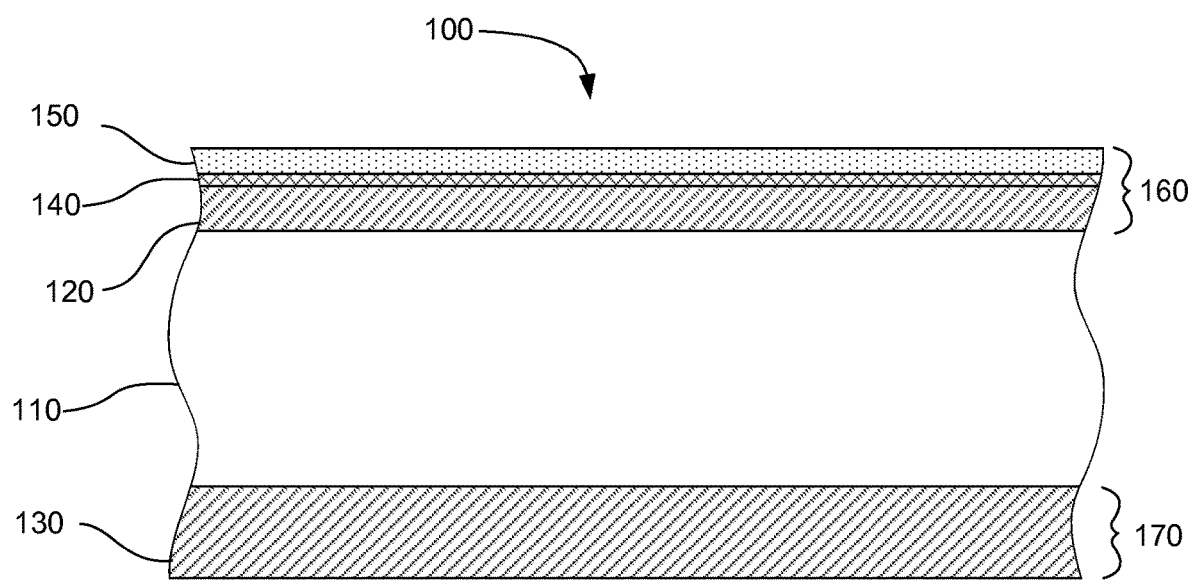
FIG. 1 is a partial cross-section of a hybrid media sheet in accordance with an example of the present disclosure.

In accordance with this, FIG. 1 shows a partial cross-section of an exemplary hybrid media sheet 100 prepared in accordance with examples of the present disclosure. The media sheet includes a media substrate 110, a front barrier layer 120 applied to a front side of the media substrate, a back barrier layer 130 applied to a back side of the media substrate, an adhesion promoting subbing layer 140 applied to the front barrier layer, and an ink-receiving layer 150 applied to the adhesion promoting subbing layer. Although the various layers have not necessarily been drawn to scale, as shown in this example, the back barrier layer is thicker than the front barrier layer. Additionally, the back barrier layer is thicker than the ink-receiving layer and the subbing layer. In this particular example, the thicknesses of the front barrier layer, subbing layer, and ink-receiving layer are selected so that the combined thickness 160 of these layers is about equal to the back barrier layer thickness 170. In other words, the thickness ratio of the back barrier layer to the combined front layers is about 1:1. In other examples, the ratio of the back barrier layer to combined front layers can be from about 0.5:1 to 2:1.

The hybrid media sheet depicted in FIG. 1 is only one specific example of the presently disclosed technology. Therefore, the disclosure is not to be limited by FIG. 1 or any of the other specific examples disclosed herein. Furthermore, in each of the various examples described herein, whether discussing the hybrid media sheets, the coating compositions, or related methods, there may be some common features that further characterize options in accordance with principles discussed herein. Thus, any discussion of the materials or methods, either alone or in combination, is also applicable to the other examples not specifically mentioned. For example, a discussion of the dimensions or compositions of layers in the hybrid media sheet in the context of the materials is also applicable to the related methods, and vice versa.

In accordance with this, the hybrid media sheet can include a substrate, such as paper. In some examples, the substrate can be a raw base paper that includes a matrix of wood fibers. These fibers can be virgin hardwood fibers, virgin softwood fibers, or combinations thereof. The fibers can have various fiber lengths. For example, in some cases the paper can have an average fiber length from about 0.5 mm to about 3 mm. Furthermore, raw base paper of various weights can be used. In some examples, the raw base paper can have a weight from about 80 $g/m^2$ to about 200 $g/m^2$. In other examples, the raw base paper can have a weight from about 120 $g/m^2$ to about 180 $g/m^2$. In one in specific example, the raw base paper can have a weight of about 150 $g/m^2$ to about 155 $g/m^2$. Additionally, the raw base paper can have a relative low level of roughness or can be smooth. In one specific example, the raw base paper (or other substrate) can have a PPS roughness of less than 4 μm. In another example, the raw base paper (or other substrate) can have a roughness of less than 50 mL/min by the Sheffield method.

In further examples of the presently disclosed technology, one or more fillers can be added to the substrate, such as to a paper fiber matrix. Fillers can in some cases reduce the cost of manufacturing paper by offsetting the fiber content. Additionally, fillers can improve various properties of the paper, such as brightness, optical properties, smoothness, opacity, dimensional stability, and others. The filler content in the raw base paper can range from about 1% to about 40% by weight. Examples of suitable fillers include calcium carbonate ($CaCO_3$), clay, kaolin, gypsum (hydrated calcium sulfate), titanium oxide ($TiO_2$), talc, alumina trihydrate, magnesium oxide (MgO), and others.

In still other examples, raw base paper can also include additives, such as sizing agents, emulsification products, strengthening agents, fixers, pH adjustors, optical brightening agents, coloring agents, and others. As used herein, "optical brightener" or "optical brightening agent" refers to dyes that absorb light in the ultraviolet and violet region (usually 340-370 nm) of the electromagnetic spectrum, and re-emit light in the blue region (typically 420-470 nm). These additives are often used to enhance the appearance of color of fabric and paper, causing a "whitening" effect, making materials look less yellow by increasing the overall amount of blue light reflected. This term includes fluorescent brightening agents (FBAs) and fluorescent whitening agents (FWAs). As used herein, "coloring agent" and "colorant" can include dyes, pigments, and/or other particulates. Dyes are typically water- or solvent-soluble, whereas pigments are typically not. As used herein, "pigment" generally includes pigment colorants, magnetic particles, aluminas, silicas, and/or other ceramics, organometallics or other opaque particles, whether or not such particulates impart color. Thus, though the present description primarily exemplifies the use of pigment colorants, the term "pigment" can be used more generally to describe not only pigment colorants, but other pigments such as organometallics, ferrites, ceramics, etc. As used herein, "dye" refers to a compound, complex, or molecule that provides color to a substrate or an ink, and is typically water- or solvent-soluble. This term also includes dyes that affect the overall color of an ink but are not themselves the predominant color. For example, a black ink may contain one or more black dye(s) but may also contain a yellow dye allowing for a more neutral black color.

In some examples the substrate can include materials other than raw base paper. The substrate can also comprise, without limitation, other materials such as wood, cloth, non-woven fabric, felt, synthetic (e.g., non-cellulosic) paper, ceramic compositions, glass or glass-containing products, vinyl, metal foils such as aluminum (Al), silver (Ag), tin (Sn), copper (Cu), and mixtures thereof, as well as composites or mixtures of such materials. Similarly, various organic polymer compositions can be used to form the substrate, such as polyethylene, polystyrene, polyethylene terephthalate, polycarbonate resins, Teflon® (polytetrafluoroethylene), polyimide, polypropylene, cellulose acetate, poly(vinyl chloride), and mixtures thereof.

Referring again to FIG. 1, the hybrid media sheet 100 can include a front barrier layer 120 and back barrier layer applied to the media substrate 110. The barrier layers can protect the substrate from moisture as well as providing support and strength to the substrate. The barrier layers can also improve curl control for the hybrid media according to the present disclosure. In conventional swellable photo papers, a common drawback is increased curling. This can occur due to changes in relative humidity that cause the water-soluble polymer in the ink-receiving layer to expand or shrink.

In some examples of the present technology, the back barrier layer can counter balance the front barrier layer and ink-receiving layer. This can be accomplished by applying the back barrier layer with a thickness that balances the thickness of the front barrier layer and ink-receiving layer. For instance, in some examples a thickness ratio of the back barrier layer to the combined front layers (i.e. barrier layer, subbing layer, and ink-receiving layer) can be from about 0.5:1 to about 2:1. Similarly, a weight ratio in $g/m^2$ of the back barrier layer to the combined front layers can be from about 0.5:1 to about 2:1. In further examples, the back barrier layer can be more closely balanced with the combined front layers. For example, a thickness ratio and weight ratio of the back barrier layer to the front barrier layer, subbing layer, and ink-receiving layer can each be about 1:1. Thus the thickness and weight of the back barrier layer can be about equal to the thickness and weight of the front barrier layer and ink-receiving layer together.

In still other examples, the front barrier layer can be thinner than the back barrier layer. A thickness ratio of the front barrier layer to the back barrier layer can be from about 1:1.5 to about 1:3. Similarly, a weight ratio of the front barrier layer to the back barrier layer can be from about 1:1.5 to about 1:3. In other examples, the front barrier layer can have a weight from about 12 $g/m^2$ to about 30 $g/m^2$, and the back barrier layer can have a weight from about 20 $g/m^2$ to about 40 $g/m^2$.

In many examples, the barrier layers can include polymer materials. In some such examples, the barrier layers can be resin coating layers. The resins can be polymeric polyolefin resins. Suitable polyolefin resins can include, without limitation, high density polyethylene (HDPE), low density polyethylene (LDPE), polypropylene (PP), polymethylpentene (PMP), copolymers of ethylene with hexane, butane, and octane (linear low density polyethylene, LLDPE), and others. The polyolefin resins can also be blends of these polymeric materials, such as HDPE/LDPE, LDPE/LLDPE, PP/LDPE, and PP/LLDPE. In certain examples, the polyolefin resins can be selected from polyethylene (PE), polypropylene, polymethylpentene, polybutylene polymer, and mixtures thereof. In some other examples, the polyolefin material can be polyethylene, polypropylene, ethylene vinyl acetate polymer, or a mixture thereof.

In certain examples, the barrier layers can be continuous layers of a polymeric polyolefin resin. The barrier layers can include polyethylene. The polyethylene can include low density polyethylene, high density polyethylene, or mixtures thereof. In some cases, the barrier layers can consist essentially of low density polyethylene, high density polyethylene, or mixtures thereof. In other examples, the back barrier layer can have a content of high density polyethylene that is greater than a content of high density polyethylene in the front layer. For example, the front layer can contain no high density polyethylene while the back layer contains any amount of high density polyethylene greater than zero. In another example, both the front and back barrier layers can comprise mixtures of low density polyethylene and high density polyethylene, with a greater content of high density polyethylene in the back barrier layer. In a specific example, the back barrier layer can include low density polyethylene and an amount of high density polyethylene from 20% to 70% by weight, and the front barrier layer comprises low density polyethylene and either no high density polyethylene or an amount of high density polyethylene that is less than the amount in the back barrier layer. Regardless of the polyolefin materials used on the front or back surfaces of the media substrate, these will sometimes be referred to as a "first polyolefin" and a "second polyolefin" for convenience. This description does not necessarily mean that the compositions are different, though in some instances, they are different. Furthermore, reference generally to a "polyolefin" includes the various types of polyolefins described herein and known in the art, such as polyolefin blends, resins, etc.

The barrier layers can also be configured to affect the appearance of the hybrid media sheet. For example, the barrier layers can have a glossy, semi-gloss, satin, or matte finish. Pigments such $CaCO_3$ and $TiO_2$ can be added to the barrier layers. Other additives such as colorants and optical brightening agents can also be included.

Referring again to FIG. 1, the hybrid media sheet 100 can include an adhesion promoting subbing layer 140 applied to the front barrier layer 120. The adhesion promoting subbing layer is not necessarily drawn to scale in FIG. 1, as this layer can generally be much thinner than the other layers. Therefore, the adhesion promoting subbing layer is drawn larger to more clearly illustrate the presently disclosed technology. The adhesion promoting subbing layer can be coated on the front barrier layer to improve adhesion of the ink-receiving layer 150. In some examples, the adhesion promoting subbing layer can have a weight from about 0.1 g/m² to about 2 g/m². In a specific example, the weight can be about 0.3 g/m² to about 0.7 g/m². In still further examples of the present technology, the adhesion promoting subbing layer can have a thickness such that the combined thickness of the subbing layer, the front barrier layer, and the ink-receiving layer are counter balanced by the back barrier layer, as previously described.

The adhesion promoting subbing layer can be formed of materials that improve bonding of the ink-receiving layer to the front barrier layer. In some examples, the materials can include polyvinyl alcohol (PVA), a copolymer of polyvinyl alcohol, gelatin, and other materials Non-limiting examples of polyvinyl alcohols and copolymers of polyvinyl alcohols that can be used include polyvinyl alcohol, polyethylene-co-polyvinyl alcohol, cationic polyvinyl alcohol, polyvinyl alcohol with an acetoacetyl functional group, polyvinyl alcohol with a silanol functional group, anionic polyvinyl alcohol, polyvinylpyrrolidone-co-polyvinylalchol, polyvinyl alcohol-co-polyethyleneoxide, and combinations thereof. The polyvinyl alcohol or polyvinyl alcohol copolymer can have a weight-average molecular weight from about 2000 Mw to about 1,000,000 Mw, for example. A cross-linking agent, such as boric acid, can be added in some specific examples. In one example, the adhesion promoting subbing layer can include from about 0.1% to about 10% by weight of a cross-linking agent. In another example, this cross-linking agent can be boric acid. Other, non-limiting examples of cross-linking agents can include borate, glutaldehyde, formaldehyde, glyoxal, succinic dialdehyde, methylolmelamine, zinc salts, aluminum salts, and combinations thereof. The cross-linking agent can in some cases reduce blocking for the base roll. In another example, a small portion of metal oxide can be included in the subbing layer. For example, the subbing layer can contain less than about 5% by weight of a metal oxide.

Referring again to FIG. 1, the hybrid media sheet 100 can include an ink-receiving layer 150 applied to the adhesion promoting subbing layer 140. In the specific example shown in FIG. 1, the thicknesses of the front barrier layer 120, subbing layer, and ink-receiving layer are selected so that the combined thickness 160 of these layers is about equal to the back barrier layer thickness 170. In other words, the thickness ratio of the back barrier layer 130 to the combined front layers is about 1:1, though ratios outside of this range can be used as well. In accordance with this, in some examples of the present technology, the back barrier layer can counter balance the front barrier layer, subbing layer, and ink-receiving layer. Therefore, the ink-receiving layer can be applied with a thickness such that the combined thickness of the front barrier layer, subbing layer, and ink-receiving layer is balanced by the back barrier layer thickness, or is within the ratios previously discussed in other specific examples.

The ink-receiving layer can include a water-soluble polymer, a mordant, and particles of a metal- or semimetal-oxide. In some examples, the water-soluble polymer can be present in an amount equal to or greater than the particles of metal- or semimetal-oxide. For example, in some cases a weight ratio of metal- or semimetal-oxide to water-soluble polymer can be from about 1:10 to about 1:1. In other examples, the ratio can be from about 1:5 to about 1:2. The water-soluble polymer can be continuous with inorganic particles distributed in the water-soluble polymer. Such mixtures of water-soluble polymers and oxide particles can impart to the hybrid media sheet a combination of light-fastness, smear-fastness, fast drying time, and good print gloss.

In some examples of the presently disclosed technology, the water-soluble polymer can be a polyvinyl alcohol (PVA), a modified polyvinyl alcohol, or a mixture of polyvinyl alcohol compounds. The basic structural formula for polyvinyl alcohol is as follows:

wherein x is from about 1 and about 10000. Polyvinyl alcohol is commercially available from numerous sources including, but not limited to, Nippon Gohsei of Osaka, Japan under the product designation GOHSENOL NH-26, as well as Air Products and Chemicals, Inc. of Allentown, Pa. (USA) under the product designation Airvol® 523.

Exemplary and non-limiting derivatives of PVA which shall be encompassed within the term "polyvinyl alcohol" as used herein include but are not limited to unsubstituted PVA (as illustrated and discussed above), carboxylated PVA, sulfonated PVA, acetoacetylated PVA, and mixtures thereof. Acetoacetylated PVA is also included, and has the following basic structural formula:

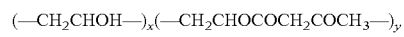

wherein x is from about 1 and about 10000 and y is from about 1 and about 100. Acetoacetylated PVA is commercially available from numerous sources including, for example, Nippon Gohsei of Osaka, Japan, under the product designation GOHSEFIMER Z 200. In some cases the ink-receiving layer can include a modified PVA formed by cationic or anionic modifications to an end of the PVA molecule. These modified PVA compounds are available from numerous sources, such as Kuraray Specialties Europe GmbH (Frankfurt, Germany) and Nippon Gohsei (Osaka, Japan).

The term "polyvinyl alcohol" as used herein shall encompass polyvinyl alcohols which are "fully hydrolyzed" or "partially hydrolyzed." During the production process associated with PVA, varying degrees of hydrolysis can occur whereby, in certain situations, residual acetate groups (—$OCOCH_3$) are left within the PVA backbone (depending on a wide variety of production and reaction parameters). For example, a PVA molecule is traditionally considered to be "fully hydrolyzed" if less than about 1.5 mole percent acetate groups are left on the molecule.

In addition, the term "polyvinyl alcohol" shall also be defined and interpreted herein to encompass structures wherein the PVA component thereof is considered to be "partially hydrolyzed." Partially hydrolyzed PVA is typically defined to include PVA molecules wherein about 1.5 to as much as about 20 mole percent or more acetate groups are left on the molecule. Again, the extent of hydrolysis will depend on a wide variety of production parameters. In some cases, the partially hydrolyzed PVA can be from about 60% to about 99.9% hydrolyzed. In certain examples, a mixture of PVA compounds each having from about 60% to about 99% hydrolysis can be used in the ink-receiving layer, or a mixture at about 80% to about 88% hydrolysis in another example. Such mixtures can provide good coalescence. An exemplary 88% hydrolyzed PVA is available from Clariant Corporation of Charlotte, N.C. (USA) under the product designation PVA 2688. Additionally, suitable PVA compounds can have a weight-average molecular weight from about 2000 Mw to about 1,000,000 Mw.

Representative and non-limiting examples of additional materials that can be used in the ink-receiving layer (as well as in other layers in the hybrid media sheet) include, without limitation, starch, SBR latex, alginates, gelatin, soybean protein, silyl-modified polyvinyl alcohol, carboxycellulose materials (for example, methyl-hydroxypropyl cellulose, ethylhydroxypropyl cellulose, or the like), polyacrylic acid or derivatives thereof, polyvinyl pyrrolidone, copolymers of polyvinyl pyrrolidone and polyvinyl acetate, modified starches including oxidized or etherified starches, casein, polyethylene glycol, polyurethanes (for example, a modified polyurethane resin dispersion), polyamide resins (for instance, an epichlorohydrin-containing polyamide), poly(vinyl acetate-ethylene) copolymer, poly(vinyl pyrrolidone-vinyl acetate) copolymer, conjugated diene copolymer latexes including maleic anhydride resin or styrene-butadiene copolymer; acrylic polymer latexes including polymers or copolymers of acrylic and/or methacrylic acids; vinyl polymer latexes including ethylene-vinyl acetate copolymers; functional group-modified latexes including those obtained by modifying the above-mentioned polymers with monomers containing functional groups (e.g. carboxyl, amino, amido, sulfo, etc.); aqueous binders of thermosetting resins including melamine resins, or urea resin; synthetic resin binders including polymethyl methacrylate, or polyvinyl butyral, alkyl resins; or mixtures thereof.

In some cases the ink-receiving layer can include more than one compound from more than one class of water-soluble polymers. In some such examples, PVA can be present as a major component of the mixture. For instance, PVA can be present in the mixture from approximately 80% to approximately 99% by weight. In one such example, the ink-receiving layer can include a water-soluble polymer mixture of about 90% to about 95% PVA and about 5% to about 10% of polyvinyl pyrrolidone. In other examples, the ink-receiving layer can include a water-soluble polymer mixture of about 90% to about 95% PVA and about 5% to about 10% of a secondary component selected from polyvinyl pyrrolidone, copolymers of polyvinyl pyrrolidone, cationic polyvinyl alcohol, carboxylated PVA, and combinations thereof.

The metal- or semimetal-oxide particles used in the ink-receiving layer can have a small particle size. For example, the particles can have an average diameter from about 10 nm to about 100 nm. The particles can include, but are not limited to, precipitated calcium carbonate, synthetic non-crystalline silica, colloidal silica, alumina, colloidal alumina, pseudo boehmite, aluminum hydroxide, and other metal- and semimetal-oxides. In some examples, the particles can be positively or negatively charged. This can be accomplished by a modification to the surface of the particles. In one specific example, the oxide particles are colloidal alumina particles. In another specific example, the oxide particles are cationic, superfine colloidal silica particles. Cationic, superfine colloidal silica is commercially available from numerous sources, such as Ludox® CL from Grace Davison (Columbia, Md.).

The mordant used in the ink-receiving layer can be a water-soluble compound that does not interact with the water-soluble polymer or cross-linking agent, if present. In addition, the mordant can be a substance that will not adversely impact the printing process. In some examples, the mordant can be a cationic polymer, such as a polymer having a primary amino group, a secondary amino group, a tertiary amino group, a quaternary ammonium salt group, or a quaternary phosphonium salt group. The mordant can be in a water-soluble form or in a water-dispersible form, such as in latex. In certain examples, the mordant can include a water-soluble cationic polymer that can be, without limitation, a polyethyleneimine, a polyallylamine, a polyvinylamine, a dicyandiamide-polyalkylenepolyamine condensate, a polyalkylenepolyamine-dicyandiamideammonium condensate, a dicyandiamide-formalin condensate, an addition polymer of epichlorohydrin-dialkylamine, a polymer of diallyldimethylammoniumchloride ("DADMAC"), a copolymer of diallyldimethylammoniumchloride-$SO_2$, polyvinylimidazole, polyvinylpyrrolidone, a copolymer of vinylimidazole, polyamidine, chitosan, cationized starch, polymers of vinylbenzyltrimethylammoniumchloride, (2-methacryloyloxyethyl)trimethyl-ammoniumchloride, polymers of dimethylaminoethylmethacrylate, polyvinylalcohol with a pendant quaternary ammonium salt, or others. Examples of water-soluble cationic polymers that are available in latex form and are suitable as mordants include TruDot P-2604, P-2606, P-2608, P-2610, P-2630, or P-2850 (available from MeadWestvaco Corp. (Stamford, Conn.)) and Rhoplex® Primal-26 (available from Rohm and Haas Co. (Philadelphia, Pa.)). Cationic polymers having a lesser degree of water-solubility can also be used in the ink-receiving layer by dissolving the polymers in a water-miscible organic solvent.

In further examples of the presently disclosed technology, the mordant can be a metal salt, such as a salt of an organic or inorganic acid, an organic metal compound, or a metal complex. In some examples, aluminum salts can be used as the mordant. The aluminum salt can include, but is not limited to, aluminum fluoride, hexafluoroaluminate (for example, potassium salts), aluminum chloride, basic aluminum chloride (polyaluminum chloride), tetrachloroaluminate (for example, sodium salts), aluminum bromide, tetrabromoaluminate (for example, potassium salts), aluminum iodide, aluminate (for example, sodium salts, potassium salts, or calcium salts), aluminum chlorate, aluminum perchlorate, aluminum thiocyanate, aluminum sulfate, basic aluminum sulfate, aluminum sulfate potassium (alum), ammonium aluminum sulfate (ammonium alum), sodium sulfate aluminum, aluminum phosphate, aluminum nitrate, aluminum hydrogenphosphate, aluminum carbonate, polyaluminum sulfate silicate, aluminum formate, aluminum diformate, aluminum triformate, aluminum acetate, aluminum lactate, aluminum oxalate, aluminum isopropionate, aluminum butyrate, ethyl acetate aluminum diisopropionate, aluminum tris(acrylacetonate), aluminum tris(ethylacetoacetate), or aluminum monoacetylacetonate-bis(ethylaceto-acetate).

In certain examples, the mordant can be a quaternary ammonium salt, such as a DADMAC derivative; an aluminum salt, such as aluminum triformate or aluminum chloride hydrate; or a cationic latex that includes quaternary ammonium functional groups. "Aluminum chlorohydrate," "ACH," "polyaluminum chloride," "PAC," "polyaluminum hydroxychloride," or the like, refers to a class of soluble aluminum products in which aluminum chloride has been partly reacted with a base. The relative amount of OH compared to the amount of Al can determine the basicity of a particular product. The chemistry of ACH is often expressed in the form $Al_n(OH)_mCl_{(3n-m)}$, wherein n can be from 1 to 50, and m can be from 1 to 150. Basicity can be defined by the term m/(3n) in that equation. ACH can be prepared by reacting hydrated alumina $AlCl_3$ with aluminum powder in a controlled condition. The exact composition depends upon the amount of aluminum powder used and the reaction conditions. Typically, the reaction can be carried out to give a product with a basicity of 40% to 83%. ACH can be supplied as a solution, but can also be supplied as a solid.

There are other ways of referring to ACH, which are known in the art. Typically, ACH comprises many different molecular sizes and configurations in a single mixture. An exemplary stable ionic species in ACH can have the formula $[Al_{12}(OH)_{24}AlO_4(H_2O)_{12}]^{7+}$. Other examples include $[Al_6(OH)_{15}]^{3+}$, $[Al_8(OH)_{20}]^{4+}$, $[Al_{13}(OH)_{34}]^{5+}$, $[Al_{21}(OH)_{60}]^{3+}$, etc. Other common names used to describe ACH or components that can be present in an ACH composition include Aluminum chloride hydroxide (8Cl); A 296; ACH 325; ACH 331; ACH 7-321; Aloxicoll; Aloxicoll LR; Aluminium hydroxychloride; Aluminol ACH; Aluminum chlorhydrate; Aluminum chlorohydroxide; Aluminum chloride hydroxide oxide, basic; Aluminum chloride oxide; Aluminum chlorohydrate; Aluminum chlorohydrol; Aluminum chlorohydroxide; Aluminum hydroxide chloride; Aluminum hydroxychloride; Aluminum oxychloride; Aquarhone; Aquarhone 18; Astringen; Astringen 10; Banoltan White; Basic aluminum chloride; Basic aluminum chloride, hydrate; Berukotan AC-P; Cartafix LA; Cawood 5025; Chlorhydrol; Chlorhydrol Micro-Dry; Chlorhydrol Micro-Dry SUF; E 200; E 200 (coagulant); Ekoflock 90; Ekoflock 91; GenPac 4370; Gilufloc 83; Hessidrex WT; HPB 5025; Hydral; Hydrofugal; Hyper Ion 1026; Hyperdrol; Kempac 10; Kempac 20; Kemwater FAX 14; Locron; Locron P; Locron S; Nalco 8676; OCAL; Oulupac 180; PAC; PAC (salt); PAC 100W; PAC 250A; PAC 250AD; PAC 300M; PAC 70; Paho 2S; PALC; PAX; FAX 11S; FAX 16; FAX 18; FAX 19; FAX 60p; PAX-XL 1; PAX-XL 19; PAX-XL 60S; PAX-XL 61 S; PAX-XL 69; PAX-XL 9; Phacsize; Phosphonorm; (14) Poly (aluminum hydroxy) chloride; Polyaluminum chloride; Prodefloc AC 190; Prodefloc AL; Prodefloc SAB 18; Prodefloc SAB 18/5; Prodefloc SAB 19; Purachem WT; Reach 101; Reach 301; Reach 501; Sulzfloc JG; Sulzfloc JG 15; Sulzfloc JG 19; Sulzfloc JG 30; TAIPAC; Taipac; Takibine; Takibine 3000; Tanwhite; TR 50; TR 50 (inorganic compound); UPAX 20; Vikram PAC-AC 100S; WAC; WAC 2; Westchlor 200; Wickenol 303; Wickenol CPS 325 Aluminum chlorohydrate $Al_2ClH_5O_5$ or $Al_2(OH)_5Cl.2H_2O$ or $[Al(OH)_2Cl]_x$ or $Al_6(OH)_{15}Cl_3$; $Al_2(OH)_5Cl]_x$ Aluminum chlorohydroxide; Aluminum hydroxychloride; Aluminum chloride, basic; Aluminum chloride hydroxide; $[Al_2(OH)_nCl_{6-n}]_m$; $[Al(OH)_3]_nAlCl_3$; or $Al_n(OH)_mCl_{(3n-m)}$ (where generally, 0<m<3n); for example.

The mordant can be present in an amount generally less than the amount of water-soluble polymer. For example, in one case a weight ratio of mordant to water-soluble polymer in the ink-receiving layer can be from about 1:5 to about 1:25. Furthermore, the mordant can include one or more of the above identified mordant materials. In some examples, the mordant can include both a cationic polymer and a metal salt. Metal salts can be effective in hybrid media sheets that will have pigment-based inks printed thereon. In one specific example, the ink-receiving layer can include from about 50% to about 95% by weight of a PVA, from 5% to 50% by weight of particles of a metal- or semimetal-oxide, and a mordant selected from a cationic polymer, a metal salt, and combinations thereof.

Aside from mordants, other optional components that can be present in the ink-receiving layer can include anionic surfactants, cationic surfactants, biocides, plasticizers, optical brighteners, pH adjustors, viscosity modifiers, leveling agents, UV absorbers, hindered amine stabilizers, anti-ozonants, silane coupling agents, and other known additives.

Figure 2:
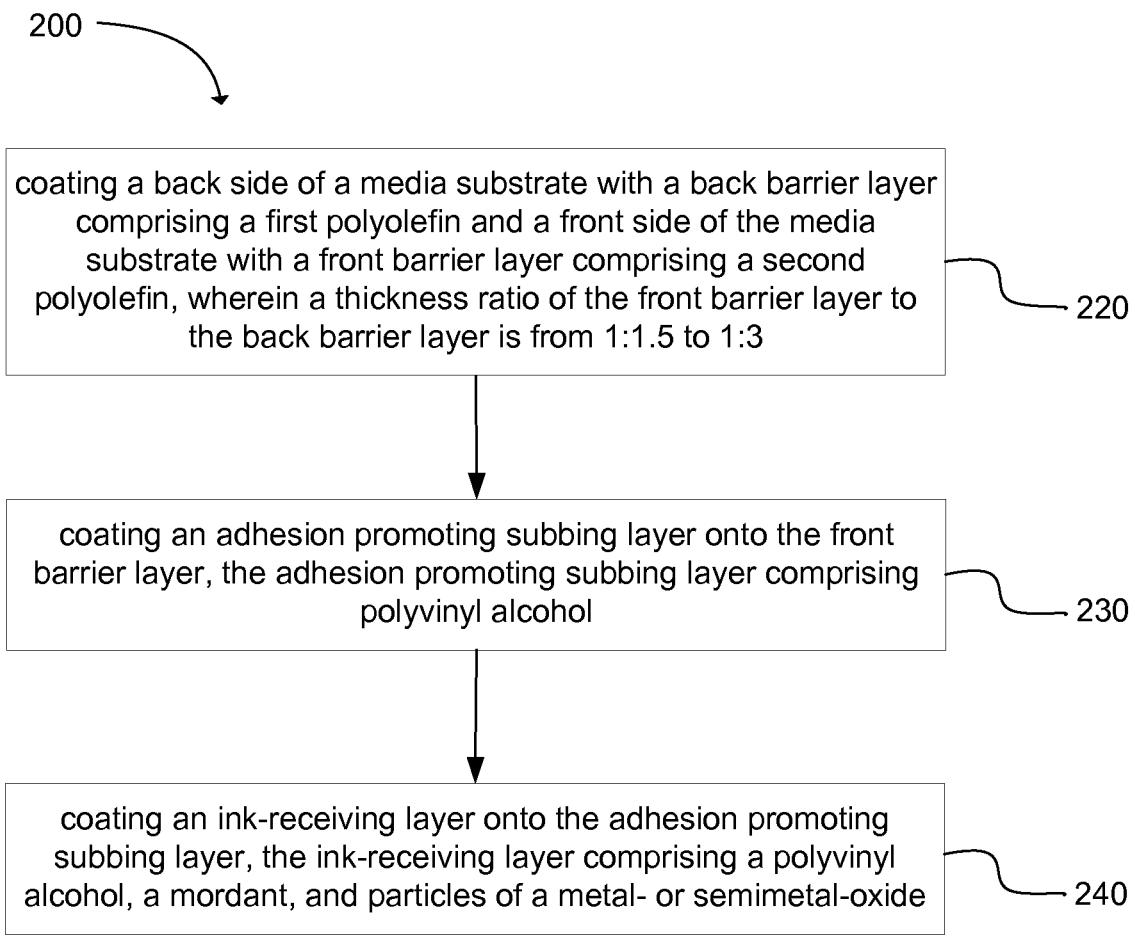
FIG. 2 is a flow chart of a method of making a hybrid media sheet in accordance with an example of the present disclosure.

Turning now to FIG. 2, a method of making a hybrid media sheet 200 can include coating 220 a back side of a media substrate with a back barrier layer comprising a first polyolefin and a front side of the sheet with a front barrier layer comprising a second polyolefin. In one specific example, a thickness ratio of the front barrier layer to the back barrier layer can be from about 1:1.5 to about 1:3. An additional step can include coating 230 an adhesion promoting subbing layer onto the front barrier layer, the adhesion promoting subbing layer comprising polyvinyl alcohol. The method can also include coating 240 an ink-receiving layer onto the adhesion promoting subbing layer, the ink-receiving layer comprising a polyvinyl alcohol, a mordant, and particles of a metal- or semimetal-oxide. The raw base paper, barrier layers, adhesion promoting subbing layer, and ink-receiving layer can be formed using any of the compositions disclosed herein.

The various layers can be applied using application methods known in the art, such as curtain, rod, wire rod, blade, roll, slot, slide hopper, gravure, cascade, or air knife coaters. In one specific example, the layers can be applied using curtain coating. In another specific example, the layers can be applied using rod coating. Layer materials can be pre-heated to a temperature above room temperature for coating. For example, the temperature can be about 40° C. or higher.

The layers can be coated at thicknesses that allow the back barrier layer to counter balance the other layers to improve curl control as described above. In one example, the adhesion promoting subbing layer and ink-receiving layer can be coated at a thickness such that a combined thickness of the front barrier layer, adhesion promoting subbing layer, and ink-receiving layer is about equal to a thickness of the back barrier layer. The layers can also have any of the weights, thickness, compositions, and ratios as described above.

Generally, coating the layers can be accomplished by mixing dry ingredients with water to form an aqueous solution or mixture, then coating the aqueous mixture onto the hybrid media sheet and allowing the mixture to dry. Compositions of the layer components disclosed herein are given as dry-basis amounts. Therefore, when making a hybrid media sheet according to the presently disclosed technology, the dry ingredients can be pre-mixed with an amount of water before coating on the media sheet. In some examples, the solid ingredients and water can be mixed with from about 19% to about 40% solid content by weight. In other examples, the ingredients can be mixed with from about 60% to about 80% water content by weight.

As used herein, "inkjet" or "inkjetting" refers to systems for ejecting compositions from a jetting architecture, such as inkjet architecture. Inkjet architecture can include thermal or piezo printheads. The term "inkjet ink" refers to inkjettable compositions that include a liquid vehicle and a colorant, such as a dye and/or a pigment. Optionally, other ingredients can be carried by the liquid vehicle as well, such as latex polymers, polymer dispersions, UV curable materials, plasticizers, antioxidants, light stabilizers, oxygen scavengers, etc. As used herein, "liquid vehicle" can include liquid compositions that can be used to carry dyes and/or other substances to a substrate. Liquid vehicles are well known in the art, and a wide variety of ink vehicles may be used in accordance with the presently disclosed technology. Such ink vehicles can include a mixture of a variety of different agents, including without limitation, surfactants, solvents, co-solvents, buffers, biocides, viscosity modifiers, sequestering agents, stabilizing agents, and water.

Lists of items or materials, such as the list of filler materials above, are presented throughout the present disclosure. As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Additionally, It is to be noted that, as used in this disclosure and the appended claims, the singular forms "a," "an," and "the" includes plural referents unless the context clearly dictates otherwise. For example, "a filler" can refer to a single filler material, as well as to multiples of such materials.

The term "about" as used above in, for example, "about 0.5 mm to about 3 mm," as well as throughout the present disclosure, is used to provide flexibility to a numerical range endpoint by providing that a given value may be "a little above" or "a little below" the endpoint. The degree of flexibility of this term can be dictated by the particular variable and would be within the knowledge of those skilled in the art to determine based on experience and the associated description herein.

Furthermore, concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 wt % to about 5 wt %" should be interpreted to include not only the explicitly recited values of about 1 wt % to about 5 wt %, but also include individual values and sub-ranges within the indicated range. Thus, included in this numerical range are individual values such as 2, 3.5, and 4 and sub-ranges such as from 1-3, from 2-4, and from 3-5, etc. This same principle applies to ranges reciting only one numerical value. Furthermore, such an interpretation should apply regardless of the breadth of the range or the characteristics being described.

While the disclosure has been described with reference to certain examples, those skilled in the art will appreciate that various modifications, changes, omissions, and substitutions can be made without departing from the spirit of the disclosure. It is intended, therefore, that the present disclosure be limited only by the scope of the following claims.

EXAMPLES

The following examples illustrate some embodiments of the hybrid media, coating compositions, and methods that are presently known. However, it is to be understood that the following are only exemplary or illustrative of the application of the principles of the present inks and methods. Numerous modifications and alternative examples may be devised by those skilled in the art without departing from the spirit and scope of the present compositions and methods. The appended claims are intended to cover such modifications and arrangements.

Example 1—Preparation of Media Sheets

A set of formulations for the ink-receiving layer was tested by preparing media sheets with the various formulations and printing an example photo on each sheet. For each media sheet prepared (with various ink-receiving layer Samples as set forth below in Table 1), a 12 $g/m^2$ ink-receiving layer was coated on a media sheet of 153 $g/m^2$ raw base, a 13 $g/m^2$ front barrier layer of 100 wt % LDPE (up to 150,000 Mw, density from 0.910 to 0.925), a 20 $g/m^2$ back barrier layer of a 60:40 (by weight) HDPE (up to 150,000 Mw) and LDPE (up to 200,000 Mw, density from 0.94 to 0.96) mix, and a thin PVA-based subbing layer on the front barrier layer. All layer ingredients were mixed with water at a solids to water ratio of 40:60 before coating on the media sheet.

Example 2—Media Sheet Testing Protocols and Results

Example Photos were printed on the media sheets of Example 1 using a HP Designjet T7100 printer loaded with a typical aqueous dye-based ink. The Example Photos were tested for dry time according to the following procedure: Print a set of images with 100% black, 100% Cyan, 100% Magenta, and 100% Yellow color squares of 2"×2". After 1 minute, apply a sheet of 8.5×11" HP all in one paper on top of the image, apply weight to the paper using a 2 lb. roller. Check if any ink is transferred to the all in one paper from the image. If no ink is transferred, then dry time is recorded as 1 min. If ink is transferred to the all in one paper, apply all in one paper to the image again after 2 minutes, check ink transfer. If no ink is transferred, then dry time is 2 min. If ink is transferred, then apply all in one paper to the image again after 3 min. Repeat this procedure until no ink transfers.

The Example Photos were tested for ink smear according to the following procedure: Print a set of images with 100% black, 100% Cyan, 100% Magenta, and 100% Yellow color squares of 2"×2". 24 hours after the images are printed, smear each color with a finger with force. Check if color is removed from the printed area to un-printed area.

The Example Photos were tested for print gloss according to the following procedure: Print a 100% black square. Measure printed gloss with a 60-degree gloss meter such as a BYK Gardner Tri-gloss meter.

The Example Photos were tested for light-fastness according to the following procedure: Print ISO light-fastness plot including all major colors and composite black with density equal to 1. Test print sample with glass cover in the light box with preset light exposure level. Measure OD change in each color until below a pre-set failure level. Calculate the light exposure time, and report in years.

Table 1 shows compositions for each tested Sample composition. Colloidal Alumina, Mordant, PVP, Colloidal Silica, and ACH content is shown in parts by weight per 100 parts Poval-235.

TABLE 1

| Ink-receiving Layer Samples | Poval-235 | Colloidal Alumina | Mordant | PVP | Colloidal Silica | ACH |
|---|---|---|---|---|---|---|
| Sample 1 | 100 | | | 5 | | |
| Sample 2 | 100 | | 11 | | | |
| Sample 3 | 100 | 11 | | | | |
| Sample 4 | 100 | 17 | 11 | | | |
| Sample 5 | 100 | 17 | 11 | | 2 | |
| Sample 6 | 100 | 25 | 15 | | | 10 |
| Sample 7 | 100 | 25 | | | | 10 |
| Sample 8 | 100 | 35 | 15 | | | |
| Sample 9 | 100 | 50 | 15 | | | |
| Sample 10 | 100 | 50 | 7 | | | |
| Sample 11 | 100 | 100 | 7 | | | |
| Sample 12 | 100 | 120 | 7 | | | |
| Sample 13 | 100 | | | | | |

Table 2 shows test results for each of the tested Ink-receiving Layer Samples. The Samples are compared with Reference 1 (HP Universal Instant Dry Photo paper) and Reference 2 (HP Universal Gloss Photo paper).

TABLE 2

| Ink-receiving Layer Samples | Dry Time | Smear-fastness | Light-fastness | Print gloss | Gamut Volume |
|---|---|---|---|---|---|
| Sample 1 | >30 min | poor | >20 yrs | 80.3 | 1991 |
| Sample 2 | >30 min | mediocre | 10 yrs | 65 | 1957 |
| Sample 3 | 15 min | poor | 15 yrs | 84 | 2050 |
| Sample 4 | 15 min | good | 10 yrs | 81 | 2042 |
| Sample 5 | 10 min | good | 10 yrs | 60 | 2005 |
| Sample 6 | 7 min | good | 8 yrs | 72 | 2039 |
| Sample 7 | 8 min | good | 8 yrs | 77 | 2085 |
| Sample 8 | 7 min | good | 7 yrs | 67 | 2023 |
| Sample 9 | 5 min | good | 5 yrs | 54 | 1894 |
| Sample 10 | 6 min | good | 7 yrs | 70 | 2039 |
| Sample 11 | 4 min | good | 5 yrs | 65 | 1830 |
| Sample 12 | 3 min | good | 5 yrs | 60 | 1894 |
| Sample 13 | >30 min | poor | >20 yrs | 81 | 1935 |
| Reference 1 | <2 min | good | <1 yrs | 54 | 1697 |
| Reference 2 | 7 min | good | 5 yrs | 69 | 1928 |

Notably, Samples 1, 2 and 13—which did not contain any oxide particles—had very long dry times, and caused undesired printing marks during printing. The smear resistance of these Samples was also poor. The results show a general trend that increased levels of oxide particles and mordant improved the dry time and smear resistance, but reduced light-fastness and print gloss. To obtain good dry time, smear-fastness, light-fastness, and print image quality, in this particular study, a ratio of alumina to PVA around 40:100 was determined to be beneficial. A second dye fixer or salt can improve dry time and smear-fastness as shown in Sample 6.

Table 3 below shows the curl performance of Sample 6 from Table 1 above, compared to a Reference sample. In each of the tested Samples, the weight ratio between the back barrier layer and the front barrier layer combined with the ink-receiving layer is approximately 1:1. The curl performance was acceptable across several relative humidity levels. The Reference sample was a photo paper without any barrier layers. As can be seen from Table 3, the curl at low humidity is greater than 50 mm for the Reference sample media. and less than 10 mm for the Sample 6 media sheet.

TABLE 3

| | 15°/20% RH | 23°/50% RH | 30°/80% RH |
|---|---|---|---|
| Reference | 55 mm | −9.9 mm | −3 mm |
| Sample 6 | 9.8 mm | −8.5 mm | −12.2 mm |

Figure 3:
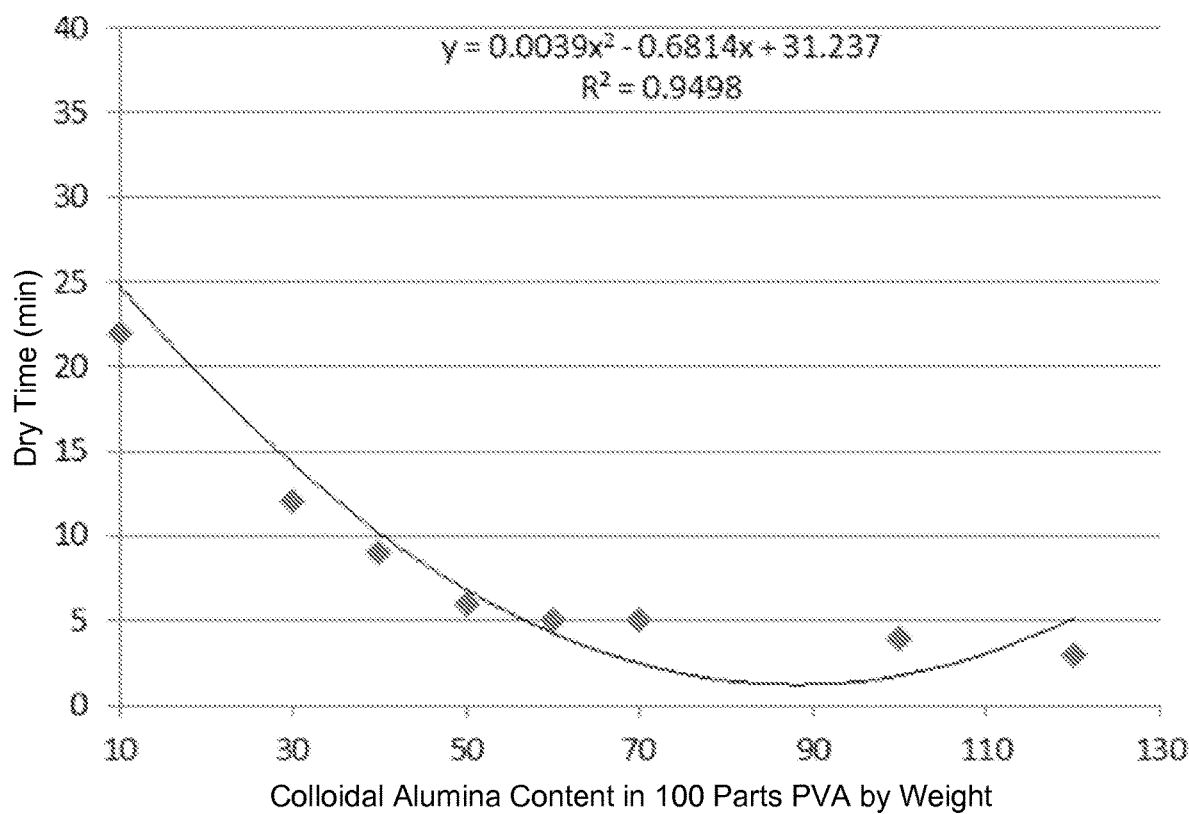
FIG. 3 is a graph of dry time and colloidal alumina content data for a hybrid media sheet in accordance with an example of the present disclosure.

FIG. 3 shows a plot of dry time vs. colloidal alumina content from the testing of the Samples above. The results show that as more metal oxide is added to the ink-receiving layer composition, the ink-receiving layer behaves more like porous media.

While the disclosure has been described with reference to certain embodiments, those skilled in the art will appreciate that various modifications, changes, omissions, and substitutions can be made without departing from the spirit of the disclosure. It is intended, therefore, that the present disclosure be limited only by the scope of the following claims.

What is claimed is:

1. A method of making a hybrid media sheet, comprising:
    coating a back side of a media substrate with a back barrier layer comprising a first polyolefin and a front side of the media substrate with a front barrier layer comprising a second polyolefin, wherein a thickness ratio of the front barrier layer to the back barrier layer is from 1:1.5 to 1:3;
    coating an adhesion promoting subbing layer onto the front barrier layer, the adhesion promoting subbing layer comprising polyvinyl alcohol; and
    coating an ink-receiving layer onto the adhesion promoting subbing layer, the ink-receiving layer comprising a polyvinyl alcohol, a mordant, and particles of a metal- or semimetal-oxide, wherein the mordant comprises a water-soluble cationic polymer and wherein the particles of metal- or semi-metal oxide comprise colloidal alumina.

2. The method of claim 1, wherein the adhesion promoting subbing layer and ink-receiving layer are coated at a thickness such that a combined thickness of the front barrier layer, adhesion promoting subbing layer, and ink-receiving layer is about equal to a thickness of the back barrier layer.

3. The method of claim 1, wherein the first polyolefin comprises low density polyethylene and the second polyolefin comprises a combination of high density polyethylene and low density polyethylene.

4. The method of claim 1, wherein the front barrier layer has a basis weight from about 12 g/m$^2$ to about 30 g/m$^2$ and the back barrier layer has a weight from about 20 g/m$^2$ to about 40 g/m$^2$, with the proviso that the front barrier layer is thinner than the back barrier layer.

5. The method of claim 1, wherein the back barrier layer comprises low density polyethylene and an amount of high density polyethylene at from 20% to 70% by weight, and the front barrier layer comprises low density polyethylene and either no high density polyethylene or an amount of high density polyethylene that is less than the amount in the back barrier layer.

6. The method of claim 1, wherein the adhesion promoting subbing layer includes the polyvinyl alcohol and from about 0.1% to about 10% by weight of a cross-linking agent.

7. The method of claim 1, wherein the particles of the metal- or semimetal-oxide are present at a particles to water-soluble cationic polymer ratio of about 1:1 to about 1:10 by weight.

8. The method of claim 1, wherein the particles of the metal- or semimetal-oxide further comprise calcium carbonate, synthetic non-crystalline silica, colloidal silica, alumina, pseudo boehmite, aluminum hydroxide, or a combination thereof.

9. The method of claim 1, wherein the particles of the metal- or semimetal-oxide further comprises cationic superfine colloidal silica.

10. The method of claim 1, wherein the mordant further comprises a metal salt.

11. The method of claim 1, wherein the media substrate comprises raw base paper and has a surface roughness of less than 4 μm.

12. The method of claim 1, wherein a ratio of the mordant to the polyvinyl alcohol of the ink-receiving layer is from about 1:5 to about 1:25 by weight.

13. The method of claim 1, wherein the polyvinyl alcohol of the ink-receiving layer is a mixture of polyvinyl alcohol compounds each having from 60% to 99% hydrolysis.

14. The method of claim 1, wherein the mordant of the ink-receiving layer comprises a polyethyleneimine, a polyallylamine, a polyvinylamine, a dicyandiamide-polyalkylenepolyamine condensate, a polyalkylenepolyamine-dicyandiamideammonium condensate, a dicyandiamide-formalin condensate, an addition polymer of epichlorohydrin-dialkylamine, a polymer of diallyldimethylammoniumchloride ("DADMAC"), a copolymer of diallyldimethylammoniumchloride-$SO_2$, a polyvinylimidazole, a polyvinylpyrrolidone, a copolymer of vinylimidazole, a polyamidine, chitosan, a cationized starch, a polymer of vinylbenzyltrimethylammoniumchloride, (2-methacryloyloxyethyl)trimethyl-ammoniumchloride, a polymer of dimethylaminoethylmethacrylate, a polyvinylalcohol with a pendant quaternary ammonium salt, or a combination thereof.

15. The method of claim 1, wherein the water-soluble cationic polymer is a polymer of diallyldimethylammoniumchloride.

* * * * *